M. SEITZ.
Beer Casks.
No. 139,334.    Patented May 27, 1873.
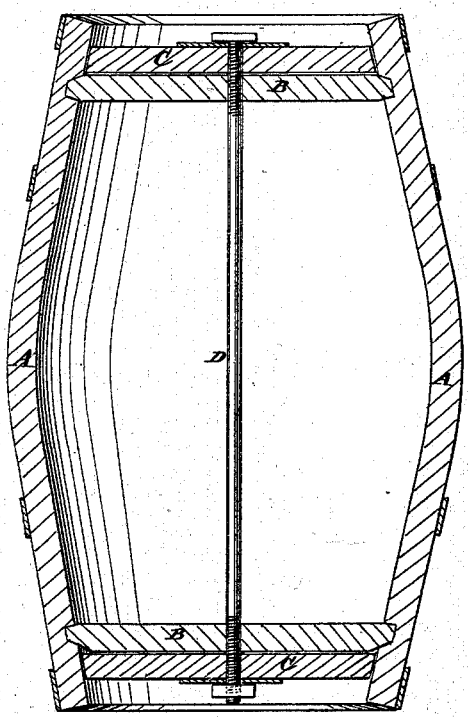
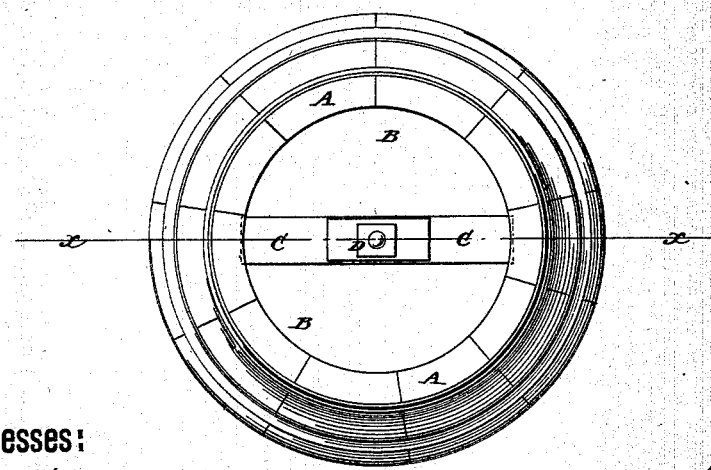
Witnesses:    Inventor:

UNITED STATES PATENT OFFICE.

MICHAEL SEITZ, OF WILLIAMSBURG, NEW YORK.

IMPROVEMENT IN BEER-CASKS.

Specification forming part of Letters Patent No. 139,334, dated May 27, 1873; application filed April 26, 1873.

*To all whom it may concern:*

Be it known that I, MICHAEL SEITZ, of Williamsburg, in the county of Kings and State of New York, have invented a new and useful Improvement in Strengthening Beer-Casks or Tuns, of which the following is a specification:

Figure 1 is a longitudinal section of a beer-cask to which my improvement has been applied. Fig. 2 is an end view of the same.

Similar letters of reference indicate corresponding parts.

My invention has for its object to prevent the heads of large beer-casks or tuns from being started or sprung by the pressure of the beer in working, and thus prevent the consequent leakage and loss. The invention consists in the combination of the rod having a head upon one end, a nut upon the other end, and screw-threads of the same pitch and running in the same direction upon both ends with the cross-bars and the heads of the casks, as hereinafter fully described.

A represents the staves and B the heads of a beer-cask, which heads are inserted in the ordinary way. C are two bars placed across the heads B, and the ends of which rest against the chines of the casks A B. D is a rod passing longitudinally through the center of the cask A B, and which has a head upon one end and a nut upon the other. The holes in the heads B and bars C are made a little smaller than the parts of the rod D that pass through them, and, upon the end parts of the said rods for a distance equal to the thickness of the heads B and bars C, are cut screw-threads of the same pitch and running in the same direction, so that the said rod may be screwed into both the said heads and bars at the same time. By this construction the threads of the said rod sinking into the wood of the said heads and bars prevent any beer from leaking out around the rod D. The head and nut of the rod D should have washers interposed between them and the bars C to prevent the said bars from being worn by the said head and nut.

Having thus described my invention, I claim as new and desire to secure by Letters Patent—

The combination of the rod D having a head upon one end, a nut upon the other end, and screw-threads of the same pitch and running in the same direction upon both ends with the cross-bars C and heads B of the cask A B, substantially as herein shown and described, and for the purpose set forth.

MICHAEL SEITZ.

Witnesses:
 JOSEPH SEITZ,
 JOHN S. KNAPP.